April 19, 1966  J. B. HOLT  3,246,943
METHOD OF AND APPARATUS FOR IMAGE PROJECTION
Filed Aug. 2, 1963  3 Sheets-Sheet 2
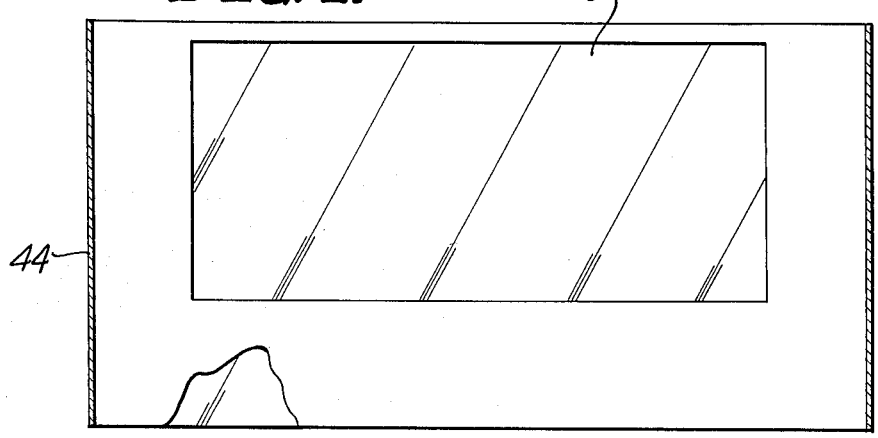
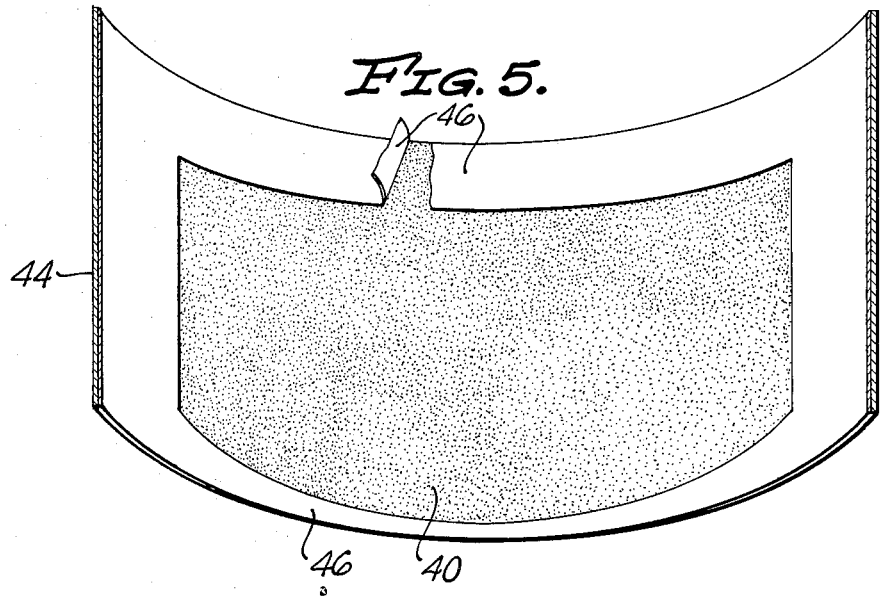
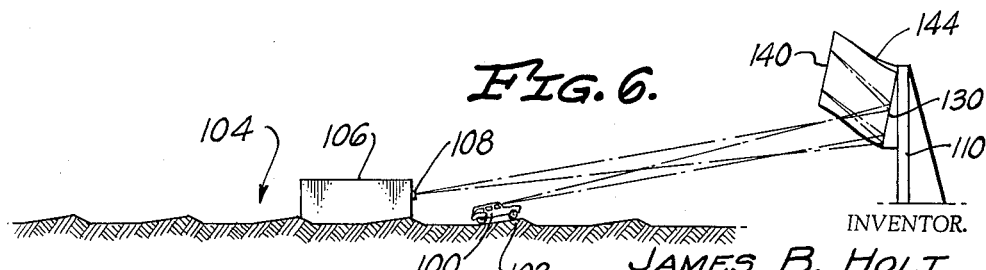
INVENTOR.
JAMES B. HOLT
BY
MAHONEY, HALBERT &
HORNBAKER
ATTORNEYS April 19, 1966   J. B. HOLT   3,246,943
METHOD OF AND APPARATUS FOR IMAGE PROJECTION
Filed Aug. 2, 1963   3 Sheets-Sheet 3
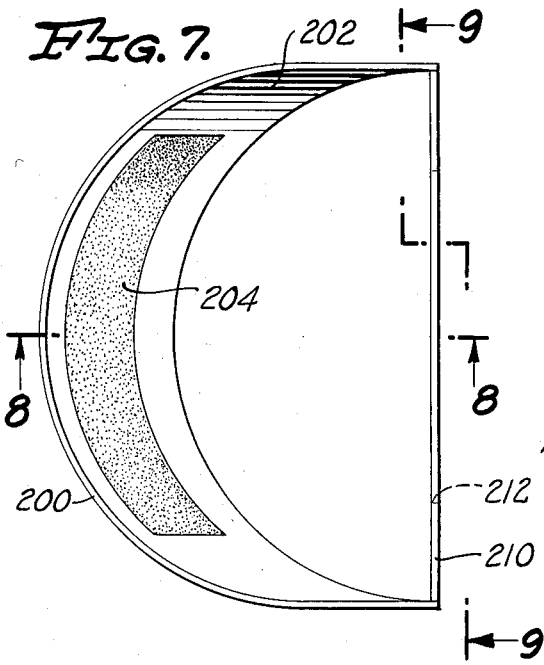
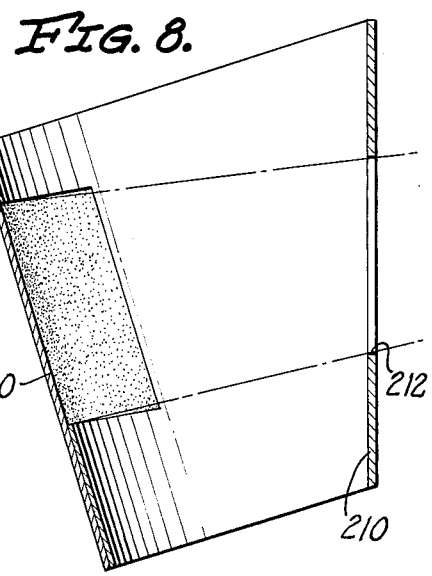
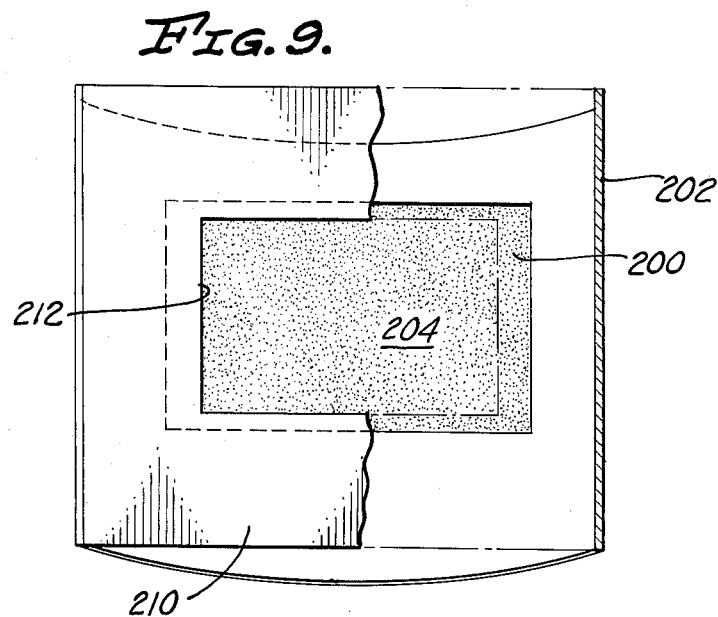
INVENTOR.
JAMES B. HOLT
BY
MAHONEY, HALBERT &
HORNBAKER
ATTORNEYS

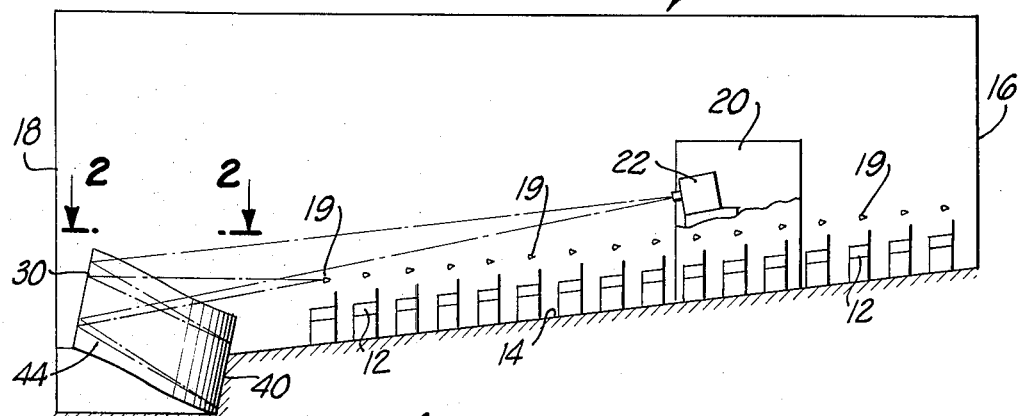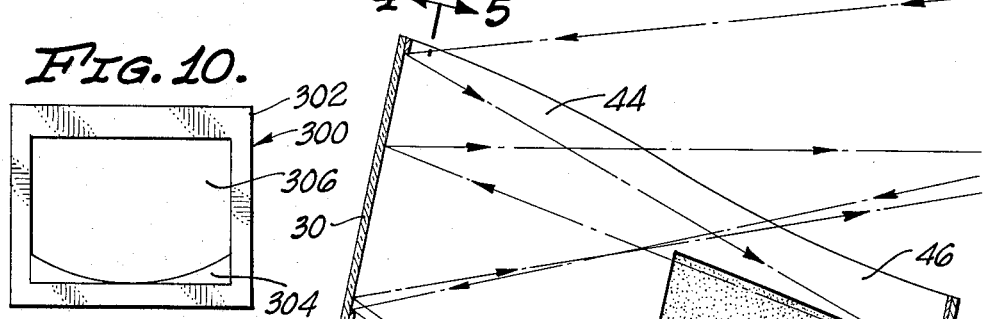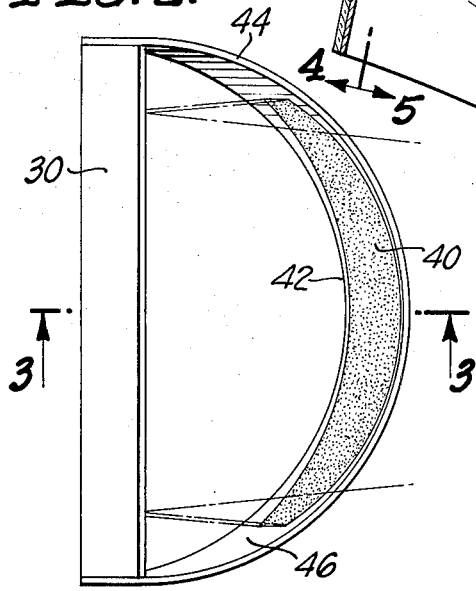

United States Patent Office 3,246,943
Patented Apr. 19, 1966

3,246,943
METHOD OF AND APPARATUS FOR IMAGE PROJECTION
James B. Holt, 6927 Varna Ave., Van Nuys, Calif.
Filed Aug. 2, 1963, Ser. No. 299,558
6 Claims. (Cl. 352—86)

This invention relates to a method of and apparatus for image projection. The invention is applicable to all forms of image projection, including but not limited to theatrical and home projection of motion pictures, TV projection of video tapes, slides, flat photographs, and drawings. The method and apparatus herein described will add substantially to the illusory three-dimensional effect of the projected image.

Several projection systems designed to impart a three-dimensional illusory effect to projected images have been devised, starting with the old stereoscope, which produced an illusory effect by combining the images of two pictures taken from points of view a little apart from each other, and continuing to the very complex systems presently available in the motion picture industry. However, it is the primary object of the present invention to provide a method and apparatus whereby three-dimensional effect may be given to a single projected image, thus eliminating the problems of exact synchronization present in multiple projection of superimposed images, and to provide a method and apparaus of the character described which is simple and inexpensive to install and operate.

It is a further object of the present invention to provide such a method and apparatus which is readily adaptable for use not only in motion picture theatres, but also in drive-in theatres, and in homes and small viewing rooms.

The foregoing objects, as well as other objects and advantages of the invention, will become apparent from a consideration of the description which follows, taken in conjunction with the drawings, in which:

FIG. 1 is a diagrammatic representation of the apparatus and method of the present invention installed and operating in a viewing room, such as a motion picture theatre;

FIG. 2 is an enlarged view taken on line 2—2 of FIG. 1;

FIG. 3 is a view taken on line 3—3 of FIG. 2;

FIG. 4 is an enlarged view taken on line 4—4 of FIG. 3;

FIG. 5 is an enlarged view taken on line 5—5 of FIG. 3;

FIG. 6 is a diagrammatic representation of an alternative form of the present invention, installed and operating in an outdoors drive-in theatre;

FIG. 7 is a view similar to FIG. 2, but showing a second alternative form of the present invention;

FIG. 8 is a view taken on line 8—8 of FIG. 7;

FIG. 9 is a view taken on line 9—9 of FIG. 7; and

FIG. 10 is an elevational view of a mask for the projection aperture of an image projector.

Illustrated in FIG. 1 of the drawings is a motion picture theatre, generally designated 10, having rows of seats 12, preferably arranged on a floor 14 declining from the rear wall 16 of the theatre 10 toward the front wall 18, so as to permit unimpeded vision of spectators seated in the seats 12 from any part of the theatre 10. The spectators have not been illustrated in FIG. 1, but the eyes of spectators are illustrated and designated 19.

Disposed in theatre 10 at any convenient place adjacent the rear wall 16 is a projection booth 20, in which a projector 22 is adjustably mounted for image projection toward the front wall 18 of the theatre 10.

As illustrated in FIGS. 1–4 of the drawings, a mirror 30 is pivotally mounted on or adjacent to the front wall 18 of the theatre 10, the mounting of the mirror 30 being adjustable so that the mirror 30 may be positioned to receive an image projected from the projector 22, and to simultaneously reflect said image to a curvilinear reflector screen 40 hereinafter described and illustrated in FIGS. 1–3 and 5 of the drawings.

The curvilinear reflector screen 40 is disposed adjacent the mirror 30 in position to receive the image reflected on it by the mirror 30 and to reflect said image back onto the mirror 30, but positioned out of the line of vision of the eyes 19 of the spectators toward the mirror 30. For those purposes it has been found preferable to mount the reflector screen 40 below the mirror 30, and hence below said line of vision.

The reflector screen 40 has a concave surface 42 disposed so as to face the mirror 30. The reflector screen 40 may be supported and kept in aligned position with the mirror 30 by an arced frame or light shield 44, the open ends of which are mounted on the sides of the mirror 30. The shield 44 is opaque so as to block out side light on the mirror 30 and on the reflector screen 40, thereby providing clearer reflection therebetween.

The reflector screen 40 is constructed of, or treated with, a highly reflective material so as to provide maximum reflection to the mirror 30. The highly reflective material referred to may be a conventional beaded screen or any other conventional screen material. Additionally, the edges of the concave surface 42 of the reflector screen 40 are masked, as by the masking material 46 best illustrated in FIG. 5 of the drawings, so that the dimensions of the reflective surface thereof will correspond to the dimensions of the mirror 30.

In operation of the form of the invention illustrated in FIGS. 1–5 of the drawings, an image is projected from the projector 22 onto the mirror 30, and the projected image on the mirror 30 is reflected onto the reflector screen 40, which in turn reflects the image back to the mirror 30, so that the spectators view the reflection of the image from the reflector screen 40 on the mirror 30. The three-dimensional illusory effect is heightened by the effective light return from the highly reflective concave surface 42 of the reflector screen 40. The angle of disposition of the reflector screen 40 relative to the mirror 30 is important in achieving the desired illusory three-dimensional effect, and in this connection it is preferred that the reflector screen 40 be tilted from its top several degree from vertical toward the spectators. Because of the diffusion of the light produced by the screen 40, the angle of reflection is shown in the drawings as different from the angle of incidence merely to illustrate the manner in which the image projected is initially caused to impinge upon the mirror 30, then to the reflector screen 40, back to the mirror 30, and to the eye of the observer. Of course, it is understood that the angle of reflection equals the angle of incidence.

Referring to FIG. 6 of the drawings, the adaptation of the present invention to a drive-in theatre is illustrated. In a drive-in theatre, as contrasted with a normal motion picture theatre, clear vision is generally achieved by raising the viewing screen and arranging the spectators' automobiles at an angle inclining upwardly toward the screen, rather than providing a declining spectator area as in the normal theatre shown in FIG. 1.

A spectator's automobile 100 is parked on an inclined ramp 102. Disposed at a convenient place toward the rear of the drive-in theatre's viewing area, generally designated 104, is a projection booth 106, in which a projector 108 is adjustably mounted for image projection toward a front wall 110.

A mirror 130, substantially similar to the mirror 30 of the first form of the invention, is pivotally mounted on or adjacent to the wall 110, the mounting of the mirror 130 being adjustable so that the mirror 130 may be positioned so as to receive an image projected from the projector 108, and to reflect said image to a curvilinear reflector screen hereinafter described. The spectators seated in automobiles, such as the automobile 100, view the reflection of the image from said curvilinear reflector screen on the mirror 130. It will be obvious that whereas the ramp 102 is inclined, while the floor 14 in the first form of the invention declines, the mirror 130 is mounted relatively higher than the mirror 30 for unimpeded spectator viewing.

A curvilinear reflector screen 140, substantially similar to the reflector screen 40, is disposed adjacent to the mirror 130 in position to receive the image reflected on it by the mirror 130 and to reflect said image back onto the mirror 130, but positioned above the mirror 130 so as to be out of the spectators' line of vision toward the mirror 130.

The reflector screen 140 has a concave surface (not shown) similar to the concave surface 42 of the reflector screen 40, said concave surface being disposed so as to face the mirror 130. The reflector screen 140 is supported and kept in aligned position with the mirror 130 by an arced frame or light shield 144, the open ends of which are mounted on the sides of the mirror 130. The shield 144 is opaque and serves to block out daylight from not only the reflector screen 140, but also from the mirror 130, so that it will be readily seen that the shield 144 will permit clear viewing of the mirror 130 even during daylight hours.

Concerning the alternative form of the invention illustrated in FIGS. 7-9 of the drawings, in lieu of the combination of the mirror and reflector screen of the first form of the invention, an arced viewing screen 200, supported by an arced frame or light shield 202, is provided. The screen 200 has a concave surface 204 which is disposed so as to face the spectators for viewing thereon of an image projected by the projector 22. The ends of the arced shield 202 are mounted on the sides of and supported by a vertical wall 210, and a rectangular opening 212 is provided in the wall 210, the opening 212 being in alignment with the screen 200 so that the image projected from the projector 22 will be framed by the opening 212 and will pass through the opening 212 onto the screen 200, while at the same time the said image on the screen 200 will be viewed by the spectators through the opening 212, with the body of the wall 210 serving as a mask to control the viewing areas. If desired, a clear pane of glass may be mounted in the opening 212.

The angle of disposition of the arced viewing screen 200 relative to the framed area about the opening 212 is also important in achieving the desired illusory three-dimensional effect in this alternative form of the invention, and in this connection it is preferred that the screen 200 be tilted in the opposite direction from the tilt described as applicable to the first and second alternative forms, the screen 200 being tilted from its top several degrees from vertical away from the spectators, thus giving a perspective of a more distant horizon and a closer foreground, the image therefore appearing to the spectators to be located at the opening 212, and extending its dimension to the depth of the screen 200.

Ideally, the viewers' line of vision in all forms of the present invention should be on substantially the same plane and substantially parallel with the line created by the angle of the projected image, and for that purpose the masking and screen tilting hereinabove described are recommended.

Additionally, in order to readily adapt the present invention for use in large motion picture theatres without requiring the relocation of existing projection equipment, it has been found desirable to provide an aperture mask 300 for mounting on the projection aperture of the projector so as to correct for the viewers' line of vision, which is positioned below the projected image line. The mask 300 may comprise a rectangular frame 302 suitable for mounting on the projection aperture of the projector 22 of FIG. 1 of the drawings, and an arced aperture mask 304 disposed in the aperture area 306 defined by the frame 302. The mask 300 is adapted to provide appropriate corrective masking on the mirror 30 and the reflector screen 40 in the form of the invention illustrated in FIGS. 1-5 of the drawings, as well as on the screen 200 and its associated wall opening 212 in the form of the invention illustrated in FIGS. 7-9 of the drawings, and it will be readily seen that the mask 300 may be easily modified for mounting on the projection aperture of the projector 108 so as to provide appropriate corrective masking on the mirror 130 and the reflector screen 140 in the form of the invention illustrated in FIG. 6 of the drawings, if desired. It will also be understood that in lieu of utilizing the separate frame 302, the arced mask 304 may be suitably separately mounted on the projection aperture.

It will be understood that, although for the purposes of ease of illustration and description, the invention has been shown and described as used for projection of slides or motion pictures in a motion picture theatre or drive-in, the invention is readily adaptable for use for TV projection, home movie projection, projection of video tapes, and projection of transparencies, flat photographs, drawings and the like, in large or small viewing areas.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures, devices and methods.

I claim:

1. Apparatus for imparting an illusory three-dimensional effect to a projected image which comprises:
    (a) an image projector;
    (b) a mirror disposed so as to receive a directly projected image from the projector and expose a reflected image for viewing; and
    (c) a curvilinear reflector screen mounted adjacent the mirror and disposed so as to receive the image from the mirror and reflect the image back onto the mirror, for viewing of the reflected image.

2. Apparatus as defined in claim 1, including a light shield mounted on the edges of the mirror and supporting the reflector screen.

3. Apparatus for imparting an illusory three-dimensional effect to a projected image which comprises:
    (a) an image projector;
    (b) a mirror disposed so as to receive a directly projected image from the projector and expose a reflected image for viewing;
    (c) a curvilinear reflector screen mounted adjacent the mirror, the reflector screen having a concave surface disposed relative to the mirror so as to receive the image reflected thereon by the mirror and reflect the image back onto the mirror, for viewing of the reflected image; and
    (d) an arced frame supporting the reflector screen and maintaining the reflector screen in its position relative to the mirror, the open ends of the arced frame being mounted on the edges of the mirror.

4. Apparatus as defined in claim 3, wherein the edges of the concave surface of the reflector screen are masked so that the dimensions of the reflective surface thereof correspond to the dimensions of the mirror.

5. Apparatus for imparting an illusory three-dimensional effect to a projected image which comprises:
    (a) an image projector;

(b) a mirror adjustably mounted and disposed so as to receive an image projected from the projector and expose a reflected image on a line of vision to viewers;

(c) a curvilinear reflector screen mounted adjacent the mirror, said reflector screen being disposed out of the line of vision, said reflector screen having a concave surface disposed relative to the mirror at an off-vertical angle toward the viewers so as to receive the image reflected thereon by the mirror and reflect the image back to the mirror, for viewing of the reflected image by the viewers, the concave surface of the reflector screen being masked so that the dimensions of the reflective surface thereof correspond to the dimensions of the mirror; and (d) an arced frame supporting the reflector screen and maintaining the reflector screen in its position relative to the mirror, the open ends of the arced frame being mounted on the edges of the mirror.

6. Apparatus as defined in claim 5, including an arced mask disposed on the projection aperture of the image projector.

References Cited by the Examiner

UNITED STATES PATENTS

| | | | |
|---|---|---|---|
| 1,212,424 | 1/1917 | Tillotson | 88—28.9 |
| 1,699,689 | 1/1929 | Curry. | |
| 2,084,795 | 6/1937 | Donle | 88—24 |
| 2,698,553 | 1/1955 | Copeland. | |

JULIA E. COINER, *Primary Examiner.*